United States Patent Office 3,334,963
Patented Aug. 8, 1967

3,334,963
METHOD OF PREPARING AN ALKALI METAL CARBONATE FROM ALKALI METAL BICARBONATE AND ALKALI METAL HYDROXIDE
Cecil G. Sisson and James L. Foster, Painesville, and Jerry R. Phillips, Perry, Ohio, assignors to Diamond Alkali Company, Cleveland, Ohio, a corporation of Delaware
No Drawing. Filed Apr. 9, 1965, Ser. No. 447,063
3 Claims. (Cl. 23—63)

ABSTRACT OF THE DISCLOSURE

Sodium carbonate is produced by mixing crude wet sodium bicarbonate crystals with an aqueous solution of sodium hydroxide, the ratio of bicarbonate to hydroxide in terms of sodium carbonate equivalents being from 6:1 to 1:1, in the presence of a total of 15–40% by weight of water thereby forming substantial amounts of sodium sesquicarbonate. The mixture thus obtained is then calcined to yield low density, anhydrous sodium carbonate having a large particle size and excellent absorptive capacities which sodium carbonate is useful in the fabrication of such items as glass and detergents.

---

This application relates to a method of manufacturing an alkali metal carbonate and comprises the steps of mixing together an alkali metal bicarbonate and an alkali metal hydroxide in a sequence to insure formation of at least substantial amounts of solid alkali metal sesquicarbonates without evidence of an anhydrous double salt, calcining the mixture thus obtained at a temperature sufficient to insure decomposition to an anhydrous alkali metal carbonate and recovering the product thus produced.

The terms "alkali metal carbonate" and "alkali metal bicarbonate" are intended to include the carbonate and bicarbonate salts of the alkali metals lithium, sodium, potassium, rubidium, cesium and francium (eka-cesium). The term "alkali metal hydroxide" is intended to embrace the same alkali metals and additionally contain a hydroxyl radical. It will be appreciated that sodium and potassium salts are more available commercially and for that reason are preferred.

In referring to materials as "light" or "dense" soda ash in portions of the specification, the apparent bulk density of the material is used as a means to designate a given material as light or dense. The apparent bulk density is determined by weighing a given volume of sodium carbonate, the bulk density of which is to be determined; the volume is measured with the material in loosely-packed condition without exterting pressure such as tamping to eliminate the voids between the particles. The weight of this volume of the sodium carbonate is translated to terms of weight of one cubic foot of material. In another expression of bulk density, the number of pounds per cubic foot is divided by the weight of one cubic foot of water, giving a non-dimensional arbitrary value. Sodium carbonate of commerce is generally considered to be light soda ash when its apparent bulk density is of the order of 30 lbs. to 45 lbs. per cubic foot, or expressed in terms of this range to the weight of one cubic foot of water, has a value from 0.5 to about 0.8. Similarly, dense soda ash generally refers to a commercial sodium carbonate having an apparent bulk density of about 60 lbs. to 65 lbs. per cubic foot, or values, in terms of one cubic foot of water within the range from 1.0–1.05.

In addition to the term "apparent bulk density," defined hereinabove, the terms "alkali metal carbonate equivalent," "soda ash equivalent," and "sodium carbonate equivalent," as used herein, are intended to mean the weight of alkali metal bicarbonate, or crude alkali metal bicarbonate, e.g., crude ammonia-soda crystals, alkali metal hydroxide, necessary to form one mole of alkali metal carbonate (sodium carbonate) upon calcination at a temperature sufficiently high to decompose the bicarbonate and liberate water, carbon dioxide, and ammonia.

In copending application Ser. No. 119,321, filed June 26, 1961, now U.S. Patent No. 3,188,170, it has been discovered that good quality alkali metal carbonates and sesquicarbonates, in which the density and particle size of the products may be controlled over a relatively wide range of values and in which a novel physical form of alkali metal carbonate or sesquicarbonate obtained, can be produced by mixing together an alkali metal carbonate, an alkali metal bicarbonate (preferably as crude alkali metal bicarbonate as obtained in the ammonia-alkali metal process) and water in a controlled sequence.

The process of this co-pending application yields a novel form of alkali metal carbonate at a reasonable cost, thus providing a product that has attained commercial success, particularly among users of soda ash, e.g., the cleaning and detergent industry and the glass industry, both of which have somewhat diverse requirements as to the bulk density and amount of fines in the product. For instance, the users of soda ash in the cleaning and detergent industry generally prefer a dust-free material having a relatively large particle size and a low apparent bulk density, for example, 25 to 35 lbs. per cubic foot, while most users of soda ash in the glass industry prefer a dust-free material having large particles and a high apparent density such as dense ash. In order to overcome the vast added expense problems associated with production of two essentially different types of soda ash, the invention of the above-said co-pending application provides a method of manufacturing sodium carbonate having a particle size distribution on the order of that of dense ash and a bulk density ranging from somewhat less than that of light soda ash to substantially less than that of dense soda ash, with said particles comprising relatively large, spheroidal particles which are free-flowing and relatively dust free. In other words, while in addition to providing a process where the product bulk density may be controlled over a wide range, the process of the said co-pending application provides a product that incorporates favorable characteristics as to particle size in soda ash having bulk density characteristics of light ash, with the particle size being equal to or greater than dense soda ash.

It has now been found that a relatively light weight form of anhydrous alkali metal carbonates consisting of relatively large spheroidal-shape crystals and containing substantially no fines and being particularly resistant to abrasion, can be formed by mixing together, in proper sequence, a crude alkali metal bicarbonate and an alkali metal hydroxide. The novel process of the instant invention, in addition to forming a product of excellent quality embracing these advantages, allows use of low cost facilities, eliminates expensive and inefficient steps and permits the use of readily available reactants.

For instance, the instant invention completely eliminates a need for outside sources of heat to aid in the reaction between the low cost addition materials as well as affording the advantage of carrying out all reactions at atmospheric pressure thus eliminating all need for costly pressure equipment as well as the hazards involved while working with such equipment. Additionally, in the system of this invention the alkali metal hydroxide may be added in any manner by merely pouring in the solution at a moderate rate thereby avoiding the necessity of more elaborate methods such as spraying the solution in the reaction zone.

As for eliminating the need for expensive steps formally associated with contemporary processes, the present novel process greatly reduces the need for screening and recycling of fines since the resultant light ash product is of proper size and does not exceed the screen limits set for dense ash (which normally calls for all material of a specified percent, such as 98%, to pass a 20-mesh screen), thus avoiding the necessity for crushing oversize lumps which is a prime source of undesired fines and developable dust that becomes free dust during handling.

Perhaps just as importantly, the instant invention does not require that any alkali metal carbonate monohydrate be added and is readily adaptable to the use of reactants in their relatively crude form, such as ammonia-soda crystals obtained from the conventional ammonia-soda process and use of readily available dilute caustic soda. Additionally, good quality soda ash can be formed from the mixture of reactants without drying or treating the crude addition materials in any manner.

In practice of the method of the present invention, the conditions thereof will be hereafter discussed in relation to the use of crude ammonia-soda crystals, e.g., crude sodium bicarbonate as obtained from the ammonia-soda process. This material typically has the following analysis:

| Ingredient: | Percent by weight |
| --- | --- |
| $NaHCO_3$ | 73.9 |
| $Na_2CO_3$ | 4.7 |
| $NH_3$ (calculated as ammonium bicarbonate) | 3.5 |
| Water | 17.8 |

The employment of the alkali metal hydroxide will also be hereinafter discussed in relation to a 35% to 50% sodium hydroxide in water solution as produced by conventional diaphragm cell or modern mercury type cells.

The crude wet sodium bicarbonate crystals are combined with the caustic in proportions varying on an $Na_2O$ basis, from six (6) soda ash equivalents of the crude sodium bicarbonate per single soda ash equivalent of the caustic, to about one (1) soda ash equivalent of crude sodium bicarbonate to one (1) soda ash equivalent of the caustic (anhydrous basis); in other words, from 6:1 to 1:1 (anhydrous basis) although the ratio preferred is about 4:1. In practice, it is frequently more convenient to determine and express the ratio of crude sodium bicarbonate crystals to NaOH in actual percent by weight (feed weight basis) to obtain a reaction product—thus the mole ratio 6:1 corresponds with about 17.8 parts crude sodium bicarbonate to about one (1) part of an aqueous solution containing about 50% by weight of caustic and the mol ratio 1:1 corresponds with about 4.1 parts of crude sodium bicarbonate to one part of an aqueous solution containing about 50% by weight of caustic with, where necessary, water being added in the amount described below. The preferred ratio calculated on an anhydrous feed weight basis can vary from 8.4 to 12.1 parts crude sodium bicarbonate to one (1) part of an aqueous solution containing about 35% or 50% by weight of caustic. When mixtures of these two ingredients are combined in the above amounts and in a manner to bring about their interspersion and granulation, the mixture thus formed is calcined at a sufficiently high temperature to insure evaporation of any grossly held water (water not chemically bound to or within a material as water of hydration), decomposition of bicarbonate and resultant sesquicarbonate. The calcined material obtained may have an apparent bulk density ranging from about 25 lbs. per cubic foot to about 35 lbs. per cubic foot. This material is a grainy, almost dustless, free-flowing sodium carbonate.

A preferred means by which the principles of the invention may be employed includes providing a suitable high speed mixer, described below, to which is added crude wet bicarbonate, sodium hydroxide, and if necessary, water. The amount of water contained, either in the crude sodium bicarbonate, the NaOH, or added additionally, must be in an amount above that normally theoretically needed to form sodium sesquicarbonate and in the range which will solubilize and promote proper crystallization of sesquicarbonate. In other words, too little water in the mix, water say below 15% of the entire mix, has been found by X-ray diffraction not to favor formation of the compound ($Na_2CO_3 \cdot NaHCO_3 \cdot 2H_2O$) and thereby results, after calcining, a soda ash product with poor attrition (for degradation) resistance and eventually causing an excess of fines in amounts wholly unacceptable by industry. Conversely, it has been found that too much water, say above 40% of the mix, serves no advantageous purpose since it will have to be removed. Thus, it can be said that the amount of water added or contained in the initial reactants is a critical factor and an amount consisting of 15% to 40% of the total mixture is proper and has been found in the reaction to result in an intermediate product containing a mixture of sodium sesquicarbonate and sodium bicarbonate but without evidence of the presence of sodium carbonate monohydrate or $Na_2CO_3 \cdot 3NaHCO_3$, even after standing twenty-four hours. If water other than that contained in the crude sodium bicarbonate and caustic is required (to bring the total content up to 15% to 40% of the mixture and preferably about 22–27% of the total) it is preferably added to the caustic prior to its addition to the bicarbonate in the reaction vessel, which can be aforesaid, a suitable high speed mixer; for example, a mixing apparatus manufactured by the Strong-Scott Mfg. Co. under the registered trademark "Turbulizer"—or any other well-known high speed contemporary mixer will work equally as well. The water, of course, can be also added directly to the crude bicarbonate, but as one skilled in the art can appreciate, the addition directly to the caustic is more practical since more dilute caustic is easier to handle, notwithstanding the advantage obtained when only one feed line is used.

When crude ammonia-soda crystals (as given in the analysis above) are used as the source of sodium bicarbonate in the method of the present invention, the ammonium bicarbonate associated therewith, in reacting with the caustic-containing liquor to liberate ammonia, also tends to favor formation of sesquicarbonate as opposed to the double salt $Na_2CO_3 \cdot 3NaHCO_3$ in the mix.

Thus the caustic solution is added to the crude bicarbonate and mixed as rapidly as possible until the reaction is complete, usually under five minutes. In the course of the reaction, some heat is liberated so that the temperature of the mix rises to around 40–80° C. The mixture thus formed is passed to a calciner, for example, an externally-fired rotary drum type in which there is thorough agitation of the particles at all times thus giving little opportunity for oversize lumps or aggregates to form and which provides for evolution of carbon dioxide, water and ammonia as is adequately described in the above-mentioned co-pending application.

EXAMPLE 1

89.3 parts of crude sodium bicarbonate crystals obtained from the ammonia-soda process and having the same analysis described above is mixed with 10.7 parts of a 35% by weight sodium hydroxide solution as produced by the electrolysis of brine in conventional diaphragm type cells. The two materials are mixed together in a suitable high speed mixer, in this instance an electric mixer manufactured by The Sunbeam Corp. and sold under the name "Sunbeam Mixmaster," with the mixing time being approximately five minutes, and the material issuing from the mixer is passed to a calciner which is an externally fired, horizontal, rotating cylinder, wherein the mixture is calcined at a temperature of the order of 200° C. with the ensuing evolution of carbon dioxide, water and ammonia. The material issuing from the calciner, after processing to remove the large particles and "fines" by collecting the material which passes through a 12-mesh screen and is retained on a 100-mesh screen, has a particle size such that about 99.3% by weight is retained on a 40-mesh screen and has an apparent bulk density of about 26.3 lb./ft.$^3$.

A "bleeding" test, a method that will be understood by those skilled in the alkali metal carbonate art, and which refers to a test run to determine the absorptive capacity of alkali metal carbonate, was performed on a sample of the above product as follows:

Fifteen grams of Triton X-100 oil containing DC Red 9 coloring agent (as manufactured by the National Aniline Div., Allied Chemical Corp.) was stirred into 35 grams of the product contained in a 250 ml. beaker. The resulting mixture of sodium carbonate, oil and coloring agent is spread to about a 3/8" thickness on a good grade of commercial white blotting paper. After about four hours, the blotting paper is inspected for the amount of coloring residue remaining thereon thus determining the absorptive capacity of the sodium carbonate. The absorptive capacity of the product proved to be good since only red specks are observed on the face of the paper thus indicating good soda ash absorption of the oil and coloring agent. Quite the contrary to the product of this invention but none the less important in showing the test results of soda ash with poor absorptive capacity, poor tests result in leaving the face of the filter paper solid red and even passes the color through the paper and is visible on the back side.

EXAMPLE 2

89.3 parts of the same type of crude wet sodium bicarbonate as that employed in Example 1 above is mixed with 7.4 parts of a 50% by weight sodium hydroxide and with 3.3 parts water being added to caustic prior to mixing. The components are again thoroughly mixed in a suitable high speed mixer for about five minutes. The material issuing from the mixer is passed to a calciner of the type described in Example 1, in which the mixture is heated to a temperature of the order of 200° C. with the ensuing evolution of carbon dioxide, water and ammonia. The material is then passed to a screen classifier wherein the material is separated and classified on a 100-mesh screen, after pre-screening about 98.9% is retained on a 40-mesh screen. The apparent bulk density of the material is about 25.9 lb./ft.$^3$.

100 grams of the product, pre-screened to −12+100 mesh, is placed in a ball mill jar with 100 grams of polyethylene beads (+6 mesh) and rolled on the ball mill for 15 minutes. After which the sample, with beads removed, is screened 5 minutes with a 100-mesh screen. The amount of particles passing through the screen is recorded as percent attrition (or degradation). The percent attrition of the product sample of this particular run is found to be about 5.1%. The absorptive capacity determined in same manner indicated in Example 1 above, is also found to be good.

Thus the calcined material is found to contain spheroidal particles which are not easily friable and have other physical properties such as solubility rates and relative absorption of the order of the product obtained in our above-mentioned application.

EXAMPLE 3

The amounts of materials added are identical to those given in Example 2, except for the water being added to the crude ammonia-soda crystals prior to the sodium hydroxide addition. About 98% of the product is retained on a 40-mesh screen and has an apparent bulk density of about 27.7 lb./ft.$^3$. The percent attrition, performed in the same manner as disclosed in Example 2, is found to be about 5.9%. The absorptive capacity performed in the same manner as disclosed in Example 1 is found to be good.

EXAMPLES 4–8

The following series of examples shows the effect of bicarbonate-caustic ratio on product quality. The conditions of mixing and calcining are identical with those described in Examples 1–3.

| Ex. | Ratio, (Na$_2$O) Bicarbonate: NaOH | Percent Conc. NaOH | Percent Water Added * | Percent Yield of Product | Product Particle Size (Cumulative percent) | | Apparent Bulk Density, lb./cu. ft. |
|---|---|---|---|---|---|---|---|
| | | | | | On 40 | On 60 | |
| 4 | 1:1 | 50 | 7.3 | 85.2 | 98.4 | 99.9 | 29.5 |
| 5 | 2:1 | 50 | 4.7 | 78.5 | 99.0 | 99.4 | 28.0 |
| 6 | 2:1 | 36 | 0.0 | 86.8 | 99.2 | 99.6 | 27.4 |
| 7 | 4.9:1 | 50 | 2.2 | 84.0 | 97.5 | 99.4 | 28.9 |
| 8 | 6:1 | 50 | 3.6 | 74.1 | 91.5 | 95.5 | 27.4 |

*Above the amount contained in crude bicarbonate and NaOH solution.

| | Percent Attrition (degradation)[1] | Absorptive Capacity [2] |
|---|---|---|
| Ex. 4 | 1.9 | Good. |
| Ex. 5 | [3] | Do. |
| Ex. 6 | [3] | Do. |
| Ex. 7 | 4.1 | Do. |
| Ex. 8 | 32.6 | Do. |

[1] Results obtained in the same manner as described in Example 2 above.
[2] Results obtained in the same manner as described in Example 1 above.
[3] None tested.

Thus from the foregoing one can appreciate that in our invention granular sodium carbonates of somewhat lower apparent bulk density than light ash but of particle size comparing favorably with dense ash, can be obtained by agglomerating crude bicarbonate obtained from the ammonia-soda process, caustic soda and with water within a specified range of 15–40% of the total mixture and calcining said agglomerate. It also will be readily apparent that our caustic system is simpler, more flexible and easier to control than that of contemporary systems. The comparative simplicity of our caustic system feed can readily be shown by the following table:

| Production system | Metered Feeds to the mixer | Metered feeds to the hydrator |
|---|---|---|
| (A) Caustic with crude bicarbonate. | Crude bicarbonate and caustic. | None. |
| (B) Light ash with crude bicarbonate and water. | Crude bicarbonate ash and water. | Do. |
| (C) Monohydrate with crude bicarbonate. | Crude bicarbonate and monohydrate. | Light ash and water. |

It is to be understood that although the invention has been described with specific reference to particular embodiments thereof, it is not to be so limited, since changes and alterations therein may be made which are within the full intended scope of this invention as defined by the appended claims.

What is claimed is:

1. The method of manufacturing an alkali metal carbonate which comprises the steps of mixing an alkali metal bicarbonate with an aqueous solution of an alkali metal hydroxide, the ratio of said bicarbonate to said hydroxide in terms of alkali metal carbonate equivalents being from about 6:1 to 1:1 and the amount of water in the total mixture being from 15 to 40% by weight, thereby forming an agglomerate and calcining said agglomerate to form an alkali metal carbonate.

2. The method of manufacturing an alkali metal carbonate which comprises the steps of mixing an alkali metal bicarbonate and an alkali metal hydroxide, the ratio of alkali metal bicarbonate to alkali metal hydroxide in terms of alkali metal carbonate equivalents being from 6:1 to 1:1, with from 15 to 40% by weight of the total mixture of water, thereby forming substantial amounts of solid alkali metal sesquicarbonate without evidence of an anhydrous double salt, calcining the mixture thus attained at a temperature sufficient to insure decomposition to an anhydrous alkali metal carbonate and recovering the alkali metal carbonate thus obtained.

3. The method of preparing low density, anhydrous sodium carbonate having a high absorptive capacity and large particle size which comprises forming a mixture by adding an aqueous solution containing from about 35 to 50% by weight sodium hydroxide to crude wet sodium bicarbonate crystals, the ratio of bicarbonate crystals to sodium hydroxide in terms of sodium carbonate equivalents being from about 6:1 to 1:1 and the amount of water in the total mixture being from about 15 to 40% by weight, thereby insuring substantially complete conversion of the sodium hydroxide and an equivalent amount of sodium bicarbonate to sodium sesquicarbonate, and subsequently calcining the resultant mixture to anhydrous sodium carbonate.

References Cited

UNITED STATES PATENTS

| 516,075 | 3/1894 | Browne et al. | 23—63 |
| 3,188,170 | 6/1965 | Mantz et al. | 23—63 |

FOREIGN PATENTS

| 13,001 | 1886 | Great Britain. |

OSCAR R. VERTIZ, *Primary Examiner.*

G. T. OZAKI, *Assistant Examiner.*